United States Patent [19]

Gerszberg

[11] Patent Number: 5,297,191

[45] Date of Patent: Mar. 22, 1994

[54] METHOD AND APPARATUS FOR REMOTELY PROGRAMMING A WIRELESS TELEPHONE SET

[75] Inventor: Irwin Gerszberg, Lakewood, N.J.

[73] Assignee: AT&T Bell Laboratories, Murray Hill, N.J.

[21] Appl. No.: 72,647

[22] Filed: Jun. 3, 1993

Related U.S. Application Data

[63] Continuation-in-part of Ser. No. 914,214, Jul. 15, 1992, Pat. No.

[51] Int. Cl.$^5$ ............................................. H04M 11/00
[52] U.S. Cl. ........................................ 379/59; 379/58; 379/63
[58] Field of Search ................................. 379/57-59, 379/62, 63; 455/33.1

[56] References Cited

U.S. PATENT DOCUMENTS

| | | | |
|---|---|---|---|
| 4,817,190 | 3/1989 | Comroe et al. | 379/63 |
| 4,833,701 | 5/1989 | Comroe et al. | 379/60 |
| 4,860,336 | 8/1989 | D'Auello et al. | 379/63 |
| 4,864,599 | 9/1989 | Saegusa et al. | 379/62 |
| 4,893,335 | 1/1990 | Fuller et al. | 379/57 |
| 4,926,460 | 5/1990 | Gutman et al. | 379/57 |
| 4,972,457 | 11/1990 | O'Sullivan | 379/63 |
| 5,046,082 | 3/1991 | Zicker et al. | 379/59 |
| 5,109,403 | 4/1992 | Sutphin | 379/63 |

FOREIGN PATENT DOCUMENTS

| | | |
|---|---|---|
| 0301573 | 2/1989 | European Pat. Off. . |
| 0332825 | 9/1989 | European Pat. Off. . |
| 0054636 | 2/1990 | Japan .................................. 379/63 |
| 8701537 | 3/1987 | World Int. Prop. O. . |

OTHER PUBLICATIONS

"Portable Communication" by P. E. Jackson et al, Proceedings of the National Communications Forum, Sep. 1988, pp. 1706-1712.

Primary Examiner—Wing F. Chan
Assistant Examiner—Dwayne D. Bost
Attorney, Agent, or Firm—Alfred G. Steinmetz

[57] ABSTRACT

Remote downloading of number assignment module designation parameters into a read-only memory circuit of a wireless telephone subscriber set (e.g., mobile, cordless, etc.) can be achieved by incorporating a tone signals receiver into the set and by bridging the receiver onto a wireless voice communication channel established between the subscriber's set and a service representative. The service representative can remotely enter subscriber-specific programming information and wireless service authorization data into the subscriber's telephone set for storage therein thereby quickly, reliably and cost-effectively providing authorized service to a new subscriber, or to an existing subscriber who requests a service change.

6 Claims, 2 Drawing Sheets

METHOD AND APPARATUS FOR REMOTELY PROGRAMMING A WIRELESS TELEPHONE SET

This application is a continuation-in-part of application Ser. No. 07/914,214, filed on Jul. 15, 1992 which is a continuation of application Ser. No. 07/590,409 filed Sep. 28, 1990 which is now abandoned.

TECHNICAL FIELD

The present invention generally relates to programming of wireless telephone sets and, more particularly, to a method and apparatus for remotely downloading Number Assignment Module (NAM) designation parameters into a mobile telephone set.

BACKGROUND OF THE INVENTION

The use of cellular mobile telecommunication has undergone substantial growth over the past few years. Due to a growing cellular customers base, cellular telephone service providers and cellular telephone service resellers are faced with serving an increased number of new subscribers demanding diversified cellular services. Also, a growing number of existing cellular subscribers tend to switch back and forth between various service providers depending on the marketing and sales incentives offered by any one of such providers to newly signed-up cellular subscribers. The foregoing shifts and variations in customer-supplier and customer-reseller relationships require programming, as well as reprogramming, of the cellular telephone sets each time a customer subscriber desires a change.

Typically, cellular service providers require that any prospective customer take the cellular telephone set, after purchasing it, to an authorized service center for programming so that such telephone set becomes an authorized cellular service user set. In the case of cellular service resellers, prospective subscribers are often asked to send the telephone set, after purchasing it, to an authorized agent for programming. In either case, the procedure is cumbersome and costly to the customer, as well as to the provider or reseller, because delays are encountered prior to the start of service. Therefore, there exists a need for a method and an apparatus for programming wireless telephone sets in a manner that quickly, reliably and cost-effectively provides telephone service to new or existing customers.

SUMMARY OF THE INVENTION

The foregoing need is met in an illustrative embodiment wherein a method for programming a wireless telephone set comprises the steps of establishing a wireless bidirectional communication path between the wireless telephone set and a distant control center; activating the wireless telephone set to receive signals from the distant control center over the communication path; receiving, over the communication path, a set of predetermined signals allocated to the wireless telephone set; and storing in the wireless telephone set the received signals.

In accordance with another embodiment, a remotely programmable wireless telephone set comprises means for establishing a wireless bidirectional voice communication path between the wireless telephone set and a distant control center; actuating means for selectively enabling the wireless telephone set to receive signals from the distant control center over the voice communication path; means for receiving, over the voice communication path, a set of predetermined signals allocated to the wireless telephone set; and means for storing in the wireless telephone set the received signals.

In accordance with a further embodiment, a method for remotely authorizing telecommunication service to a mobile telephone set from a control center comprises the steps of establishing a wireless bidirectional voice communication path between the control center and the mobile telephone set for transmitting and receiving multifrequency tone signals therebetween over the voice communication path; receiving, at the control center, predetermined identification indicia associated with the mobile telephone set; and transmitting from the control center, over the voice communication path in response to the received identification indicia, service authorization tone signals allocated to the mobile telephone set. Upon receipt, at the mobile telephone set, of the service authorization tone signals, digital representations of such tone signals are stored in a permanent memory within the set.

In accordance with a particular illustrative embodiment of the invention, a mobile telephone set for transmitting and receiving voice and tone signals over communications channels comprises a radio transceiver; a tone signals receiver connected to the radio transceiver; actuating means for selectively placing the mobile telephone set in a program mode; means responsive to the actuating means for enabling the tone signals receiver to receive, over the voice communication channel and via the transceiver, tone signals representative of mobile service authorization codes; and means for storing the received tone signals, thereby programming the mobile telephone set with corresponding mobile service authorization codes. In a preferred embodiment, the tone signal receiver includes a dual tone multifrequency (DTMF) receiver, e.g. a touch-tone signaling receiver.

BRIEF DESCRIPTION OF THE DRAWING

Further features and advantages of the present invention will become apparent from the following detailed description taken together with the drawings in which.

DETAILED DESCRIPTION

Figure 1:
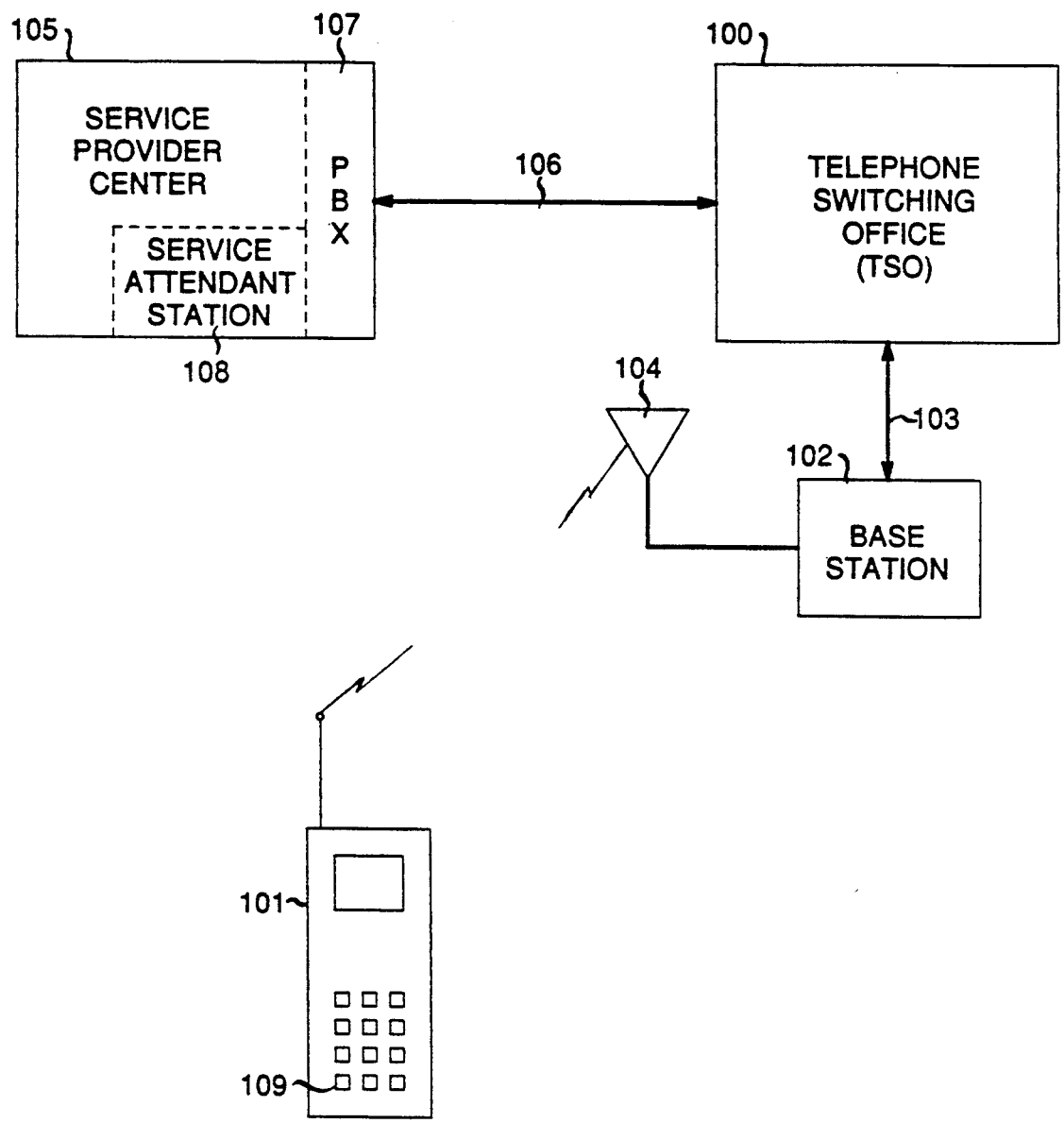
FIG. 1 is a schematic block diagram representation of a wireless telephone communication configuration in accordance with an embodiment of the invention.

Shown in FIG. 1 is a schematic representation of a wireless communication configuration which illustratively includes a telephone switching office (TSO) 100 which is adapted to link a wireless telephone set 101 into a regional or nationwide telephone network (not shown). A base station 102, coupled to the TSO 100, via a bidirectional communication link 103, is arranged to be in radio frequency communications with the wireless telephone set 101 via a radio frequency antenna 104. Also shown in schematic form, is a communications service provider center 105 adapted to be coupled to the TSO 100 via another bidirectional link 106. The service provider center 105 includes, inter alia, a telephone private branch exchange (PBX) 107, and a service attendant station 108 coupled to the PBX 107. It is well within the spirit and scope of the present invention that the wireless telephone set 101 may include a fixed wireless telephone station, a mobile/cellular telephone set, or a cordless-type telephone set.

Normally a mobile wireless telephone set, such as disclosed herein, may not initiate and complete radiotelephone calls until it is registered with and authorized for service by a service provider. All regular radiotelephone communication channels are blocked to unauthorized callers who are not registered and authorized for service. Virtually all service providers however do provide continuously unblocked service channels for permitting mobile wireless telephone sets to communicate with the service center without having prior registration and authorization. This is typically a 611 number and may be accessed by any handset whether it is presently authorized or not.

The principles and features of the present invention shall be hereafter described in connection with FIG. 1. Upon the purchase or lease of the wireless telephone set 101, a prospective subscriber would be assigned by the vendor or lessor a valid wireless telephone number which typically would include an area or regional code number followed by a station number. In order for the subscriber to be able to use the wireless telephone set 101, a telephone service provider or reseller, of the subscriber's choice, must authorize such use by programming the set 101 so that it is identifiable within the wireless telephone network as an authorized and legitimate wireless service subscriber/user. The programming of the set 101 is achieved by having the subscriber dial, out of the set 101, a predetermined service center number to first establish a communication path over the unblocked service channel with the service provider center 105 via the radio antenna 104 and base station 102, the bidirectional link 103, the TSO 100 and the other bidirectional link 106. Once the communication path is established between the telephone set 101 and the service provider center 105, the subscriber/user can verbally, or by means of the telephone set dial, convey to an operator at the service attendant station 108 any requested subscriber-specific information. In accordance with an illustrative embodiment, the telephone set 101 is equipped with a program activating key 109 adapted to bridge an audio signal receiver (not shown), which is located within the telephone set 101, onto the then currently established communication path with the service center 105. In turn, the operator at the attendant station 108 would bridge an audio signal transmitter located at the center onto the communication path. The foregoing in effect couples the transmitter at the center 105 with the telephone set signal receiver so that the service operator can remotely enter information directly into the set 101. As mentioned above, the information intended to be entered and stored in the telephone set 101 is specific to the subscriber owner or lessee. In the case of cellular mobile communication services, such information is referred to as Number Assignment Module (NAM) designation parameters. A sample of such NAM designations that can be remotely downloaded into the telephone set 101 are listed in the following table:

| System Identification | 00022 |
| Telephone Number | 2013866366 |
| Access Overload Class | 06 |
| Group Identification | 10 |
| Initial Paging Channel | 0334 |
| Security Lock Code | 6366 |
| Local Use Flag | 1 |
| A/B System Selection | 1 |

-continued

| Min Mark Flag | 1 |

The service operator at the station 108 can either use a telephone keypad as means for generating and transmitting the above NAM designation parameters, or alternatively can enter the above-listed information into a data terminal, e.g. a computer, that is coupled to a signal transmitter, e.g. a DTMF generator. In the above example, a total number of NAM characters to be transmitted includes 30 digits, with each digit having a value of 0 through 9. With the addition of an initial character to denote the beginning of transmission (e.g. "*"), an ending character to indicate the end of transmission (e.g. "#"), and, for example, a three-digit cyclic redundancy check (CRC) coding segment, the information is transmitted as follows:

*00022201386636606100334636611#BBB wherein BBB is a CRC 8 checksum byte. Once the above information is received, detected and stored in the telephone set 101, the latter is switched back into normal (i.e., voice) telephone service operation at which point the subscriber user is informed by the service operator that the telephone set 101 is fully programmed and ready for use.

Figure 2:
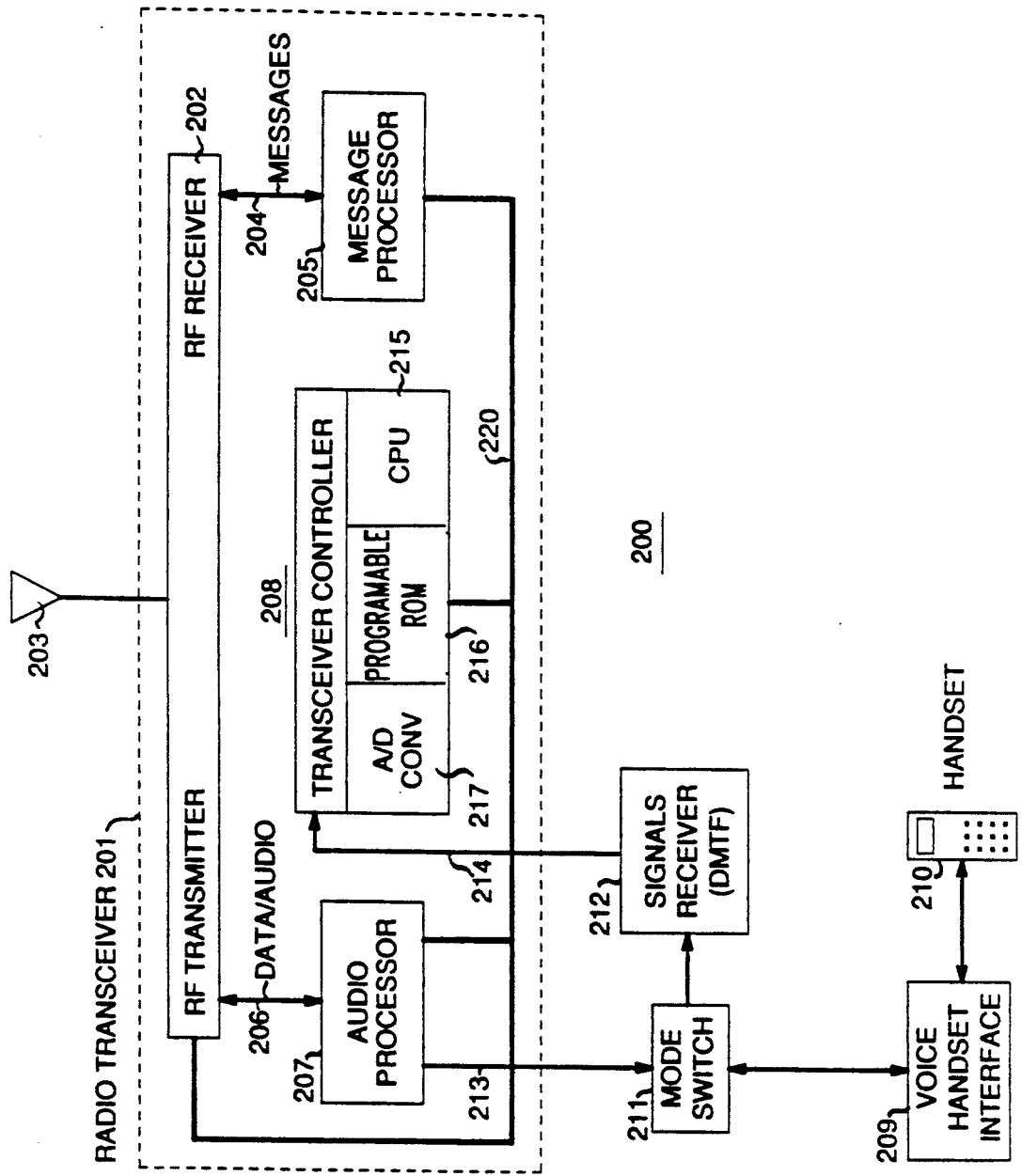
FIG. 2 is a block diagram configuration of a wireless telephone set in accordance with a preferred embodiment of the invention.

Referring now to FIG. 2, there is shown in functional block diagram form, a wireless telephone 200 in accordance with a preferred embodiment of the invention. The wireless telephone 200 comprises a radio transceiver portion 201 which includes a radio frequency receiver/transmitter 202 coupled to an antenna 203 and adapted to receive and transmit signals from and to a base station, e.g. a mobile cell site, or another wireless telephone. Coupled to the receiver/transmitter 202, via a bidirectional message connecting lead 204, is a processor 205 capable of receiving and processing system message-type signals. Also coupled to the receiver/transmitter 202, via another bidirectional lead 206, is a processor 207 adapted to process data signals as well as audio signals originating or received at the wireless telephone 200. Audio and data signals present on lead 206 are those signals intended for and derived from the antenna 203.

Within the radio transceiver 201, a controller 208 is coupled to the message processor 205 and the audio processor 207, via a control bus 220, which is also coupled to the receiver/transmitter 202. A voice handset interface circuit 209 interconnects the audio processor 207 and a telephone handset 210. In accordance with one illustrative embodiment, interposed between the voice handset interface 209 and the radio transceiver 201 is a mode switch 211, which in turn is coupled to a signals receiver 212. The latter is coupled via lead 214, to the transceiver controller 208. During the remote programming, or NAM designation parameters downloading, of the telephone set 200, the mode switch 211 diverts signals received at the antenna 203 and present on output lead 213 of the audio processor 207 to the signals receiver 212. The signals receiver 212 may be selected among known commercially available receivers, such as, for example, the Hitachi HD404678 4-bit microprocessor with an integral DTMF receiver. In the case where the programming signals out of the audio processor 207 and present on lead 213 are in digital form, the signals receiver 212 couples such digital signals to the controller 208 wherein an internal controller processing unit 215 directs such digital information for storage in a memory circuit within the controller 208, such as, for example, permanent read-only memory 216. Alternatively, if the programming information received at the antenna 203 is in the form of a sequence of tone signals, the receiver 212 (which in such case would be a tone signals receiver) would connect such signals to an analog-to-digital converter 217 located within the controller 208. The digital output signals generated by the converter 217 would next be stored in the memory circuit 216 under the control of the processing unit 215.

The method of authorizing a service to a mobile wireless telephone set is shown in FIG. 3. The flow process starts at terminal 301 and in subsequent instruction block 303 a voice communication path is established between the mobile wireless telephone set and a control center. The mobile wireless telephone set is placed in a program mode as indicated by block 305. Information indicative of the mobile wireless telephone set identification is transmitted as per block 307. Service authorization codes are received from the service center in block 309, as channel tone signals and these tones are converted to authorization codes as indicated by the block 311. The mobile wireless telephone set stores these authorization codes as indicated by block 313 and the set is programmed with corresponding authorization codes as per block 315. The flow process terminates at terminal 317.

Although the present invention has been described in connection with particular embodiments thereof, additional embodiments, modifications and applications which will be apparent to those skilled in the art are included within the spirit and scope of the invention. For example, although the remotely programming of a wireless phone is described above with reference to touch tone-type signaling, other signaling techniques and sequences, whether digitally encoded or not, may be used to accomplish the remote downloading of NAM designation parameters.

I claim:

1. An improved wireless mobile radiotelephone set adapted for operation in a cellular mobile radio telecommunications system; comprising:
   a transmit and receive antenna;
   a radio transceiver connected to the antenna and including, a radio transmitter, a radio receiver and an audio processor for processing received and originated voice and data signals;
   a voice handset and handset interface coupled to the audio processor;
   wherein the improvement comprises:
   a mode switch interconnecting the voice handset and handset interface to the audio processor;
   a tone signals receiver connected to the mode switch to receive tone signals representative of mobile service authorization codes sent from a service provider center, over a channel unblocked to unauthorized subscribers and transmitted to it by mode switch;
   a transceiver controller connected to the tone signals receiver and responding to service authorization tone signals placing the wireless mobile radiotelephone set into a program mode and enabling reception of the tone signals;
   the transceiver controller including a converter for converting the tone signals into digital signals and a memory for storing the digital signals representing mobile service authorization codes that are specific to the wireless mobile radiotelephone set owner and operative for enabling telephone service to the wireless mobile radiotelephone set.

2. A mobile telephone set according to claim 1, wherein the tone signals receiver includes a dual tone multifrequency receiver.

3. A mobile telephone set according to claim 1, wherein the tone signals receiver includes an audio frequency tone receiver.

4. An improved method for programming information into a wireless mobile radiotelephone set; comprising the steps of:
   establishing a wireless bidirectional voice communication path between a wireless mobile radiotelephone set and a distant control center over a channel unblocked to unauthorized subscribers;
   selectively placing the mobile wireless mobile radiotelephone set in a program mode;
   wherein the improvement comprises:
   transmitting from the mobile wireless to a service provider center radiotelephone set identification indicia associated with the mobile wireless radiotelephone set;
   at the mobile wireless radiotelephone set receiving from the distant control center over a voice communication channel tone signals representative of mobile signal authorization codes specific to an owner of the wireless mobile radiotelephone set in response to the identification indicia transmitted by the mobile wireless radiotelephone set;
   at the mobile wireless radiotelephone set converting the tone signals into telecommunication authorization codes;
   at the mobile wireless radiotelephone set storing the telecommunication digital authorization codes in a nonvolatile memory contained within the mobile wireless radiotelephone set; and
   programming the mobile wireless radiotelephone set with corresponding service authorization codes to enable telephone service to the mobile wireless radiotelephone set.

5. A method for programming information into a wireless mobile radiotelephone set as claimed in claim 4; comprising the further steps of:
   using multifrequency signals for the tone signals and using an audio receiver to receive the multifrequency tone signals.

6. A method for programming information into a wireless mobile radiotelephone set as claimed in claim 5; comprising the further step of:
   including in the mobile service authorization codes number assignment module designation parameters.

* * * * *